Patented Oct. 3, 1939

2,174,823

UNITED STATES PATENT OFFICE 2,174,823

VALUABLE CHROMIFEROUS DYESTUFFS AND A PROCESS OF PREPARING THEM

Erich Fischer, Bad Soden in Taunus, Germany, assignor to General Aniline Works, Inc., New York, N. Y., a corporation of Delaware No Drawing. Application March 10, 1937, Serial No. 130,220. In Germany March 11, 1936

8 Claims. (Cl. 260—366)

The present invention relates to valuable chromiferous dyestuffs and to a process of preparing them. I have found that valuable chromiferous dyestuffs may be obtained, by treating with an agent yielding chromium a dyestuff sulphonic acid or a salt thereof obtainable by condensing an aminosubstituted ortho-hydroxy-carboxylic acid or a derivative thereof, with an anthraquinone compound containing in 1-position a hydroxyl or an amino group and in 4-position a halogen atom and which may contain in the remaining positions substituents such as for instance, hydroxyl-halogen, amino group, sulfonic acid group or the radical of an aminosubstituted orthohydroxy-carboxylic acid bound at its nitrogen atom. As parent materials there may be used, for instance, such as are obtained by condensation of a 1-hydroxy- or 1-amino-4-halogen-anthraquinone with an amino compound of the aromatic series containing the radical of the salicylic acid.

As agents yielding chromium there may be used inorganic chromium salts, such as chromic fluoride, chromic sulfate or chromic chloride, as well as organic chromium salts, for instance, chromic acetate, chromic formate, or also mixtures of them. The treatment of the dyestuff sulfonic acids with the agents yielding chromium may be performed in a solution or suspension having neutral, alkaline or acid reaction to Congo or to litmus paper, with or without additions, such as for instance, of sodium acetate or pyridine, and under ordinary or raised pressure. The chromiferous dyestuffs obtainable according to the present invention dye, for instance, wool violet, blue, grey to green tints, which are especially distinguished by their clearness and their fastness to light.

The following examples serve to illustrate the invention, but they are not intended to limit it thereto; the parts are by weight:

(1) 65.2 parts of the anthraquinone dyestuff of the following formula:

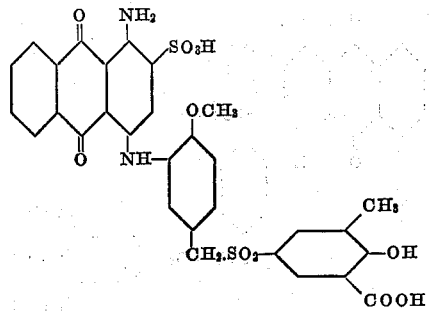

obtainable according to Example 19 of U. S. Patent application Serial No. 54,940, are dissolved in water in the form of its sodium salt, an aqueous solution of chromic formate, corresponding to 20 parts of chromic oxide, is then added and the whole is maintained for some hours, for instance, for 5 to 10 hours, at boiling temperature, in the reflux apparatus. The dyestuff solution is evaporated to dryness, the solid residue is treated with water and sodium carbonate and the chromium compound is salted out from the solution obtained, filtered with suction and dried. It constitutes a blue powder and yields, when dyed on wool, according to the usual dyeing prescription for chromiferous dyestuffs, blue tints which are distinguished by their good fastness to light and especially by their clearness. In full dyeings navy blues of good fastness to transpiration and to sea-water are obtained.

(2) 65 parts of the dyestuff

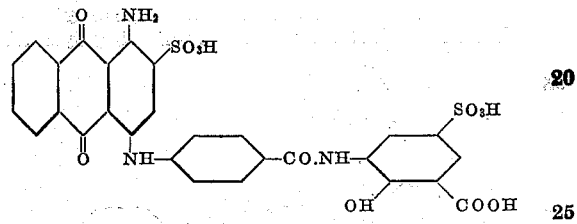

obtainable by condensation of 1-amino-4-bromanthraquinone-2-sulfonic acid with para-aminobenzoyl-ortho-amino-sulfo-salicylic acid, are dissolved in water in the form of the sodium salt and, after addition of 20 parts of chromic fluoride, boiled for some hours, for instance, for 5 to 10 hours, in the reflux apparatus. After cooling, the chromium complex compound of the dyestuff which has been formed, is filtered with suction, dissolved in water and sodium carbonate and salted out. It is, after filtering with suction and drying, a blue powder. The blue dyeings of this chromium compound are distinguished by their brightness, their good fastness to light and by their good fastness to washing and to sea-water.

(3) 55 parts of the condensation product from 4-bromo-1-aminoanthraquinone-2-sulfonic acid and 5-(3'-amino-benzoyl)-2-hydroxy-benzoic acid:

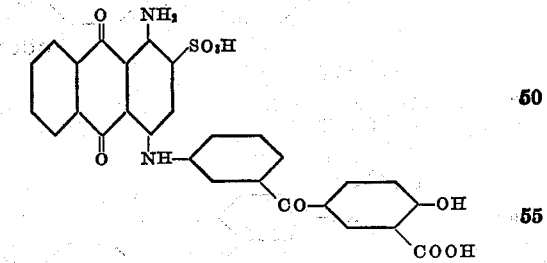

are dissolved in 5000 parts of hot water with addition of 8 parts of sodium carbonate. The solution obtained is heated to boiling, for about 12 hours, with 820 parts of a solution of chromic formate of 3.52 per cent. strength. After cooling, the whole is filtered with suction, the solid residue is, with addition of a proportion of sodium carbonate as small as possible, dissolved in boiling water and the chromium compound is precipitated from the filtrated solution by adding sodium chloride; the precipitate is then filtered with suction, washed by means of a strongly diluted sodium chloride solution and dried. It is a blue powder and yields, for instance on wool, clear blue tints being very fast to light.

(4) If in the process of Example 1 the dyestuff is replaced by 45 parts of the dyestuff having the constitution:

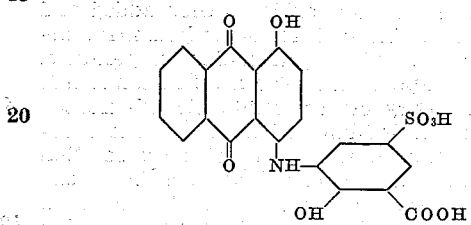

and obtainable by condensation of 1-hydroxy-4-bromo-anthraquinone with ortho-amino-sulfo-salicylic acid, a chromium compound of the above dyestuff is obtained, which forms, after being worked up as usual, a green powder yielding green dyeings on wool.

(5) If the process described in Example 2 is performed with 56 parts of the following dyestuff:

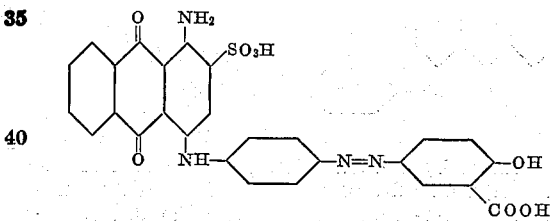

which is obtainable according to Example 24 of United States patent application Serial No. 54,940, a chromium compound is obtained which yields on wool green dyeings of great fastness to light.

(6) In a manner similar to that described in Example 1, the dyestuffs of the following constitutions may be transformed into their chromium complex compounds:

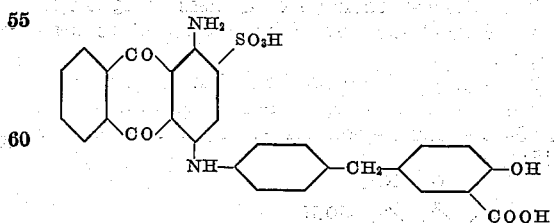

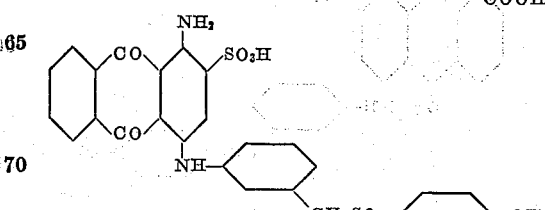

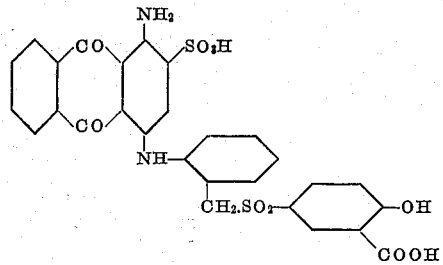

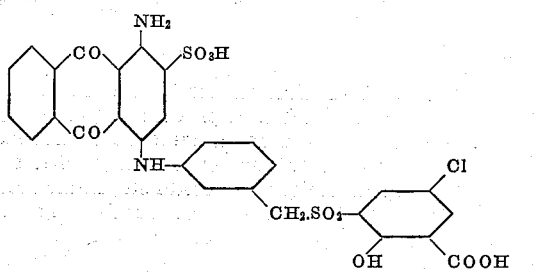

They have properties similar to those of the chromium complex compounds described in Example 1.

I claim:

1. The process which comprises treating with an agent yielding chromium an anthraquinone compound of the general formula:

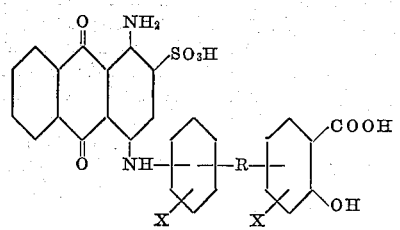

wherein X represents a member of the group consisting of hydrogen, methyl, chlorine, methoxy and sulfonic acid, and R represents a member of the group consisting of —CH$_2$.SO$_2$—, —CONH—, —CH$_2$— and —CO—.

2. The process which comprises boiling for some hours with an aqueous solution of chromic formate an aqueous solution of the compound of the formula:

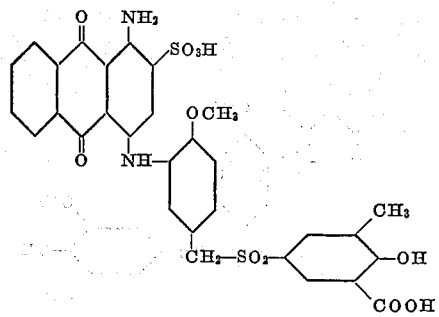

3. The process which comprises boiling for some hours with an aqueous solution of chromic fluoride an aqueous solution of the compound of the formula:

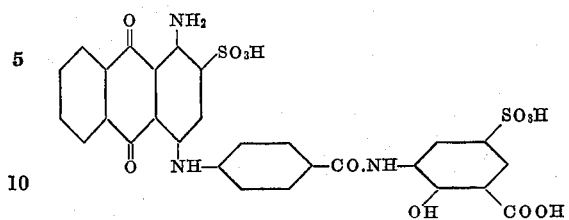

4. The process which comprises boiling for twelve hours with an aqueous solution of chromic formate an aqueous solution of the compound of the formula:

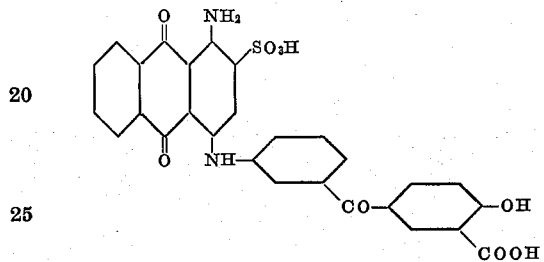

5. The chromium complex compounds of the general formula:

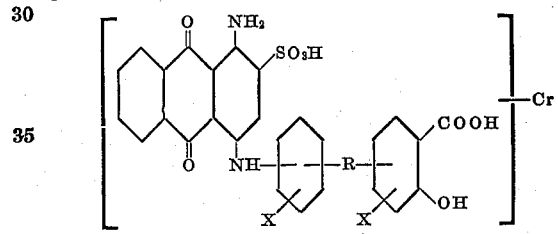

wherein X represents a member of the group consisting of hydrogen, methyl, chlorine, methoxy and sulfonic acid, and R represents a member of the group consisting of —CH₂.SO₂—, —CONH—, —CH₂— and —CO—.

6. The chromium complex compound of the formula:

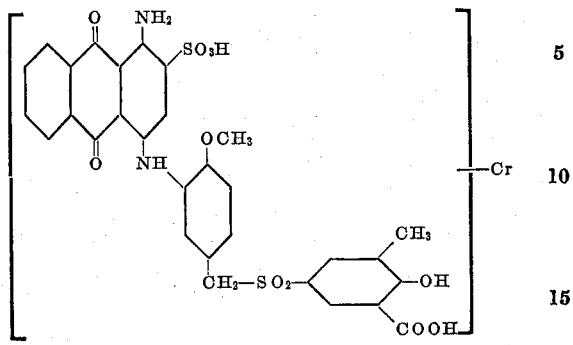

7. The chromium complex compound of the formula:

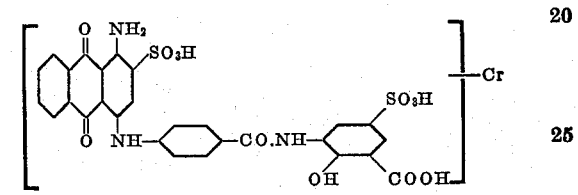

8. The chromium complex compound of the formula:

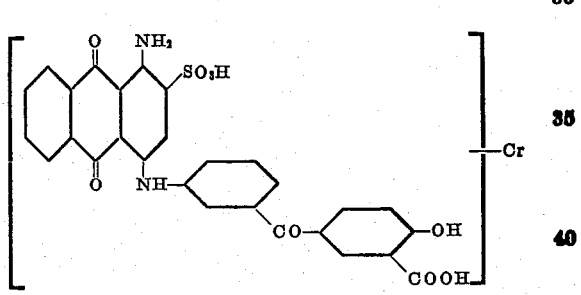

ERICH FISCHER.